Aug. 5, 1958   D. W. HARLING   2,846,570
ADJUSTABLE SUPPORT FOR A FLUORESCENT STREET LIGHT
Filed Jan. 28, 1955   3 Sheets-Sheet 1
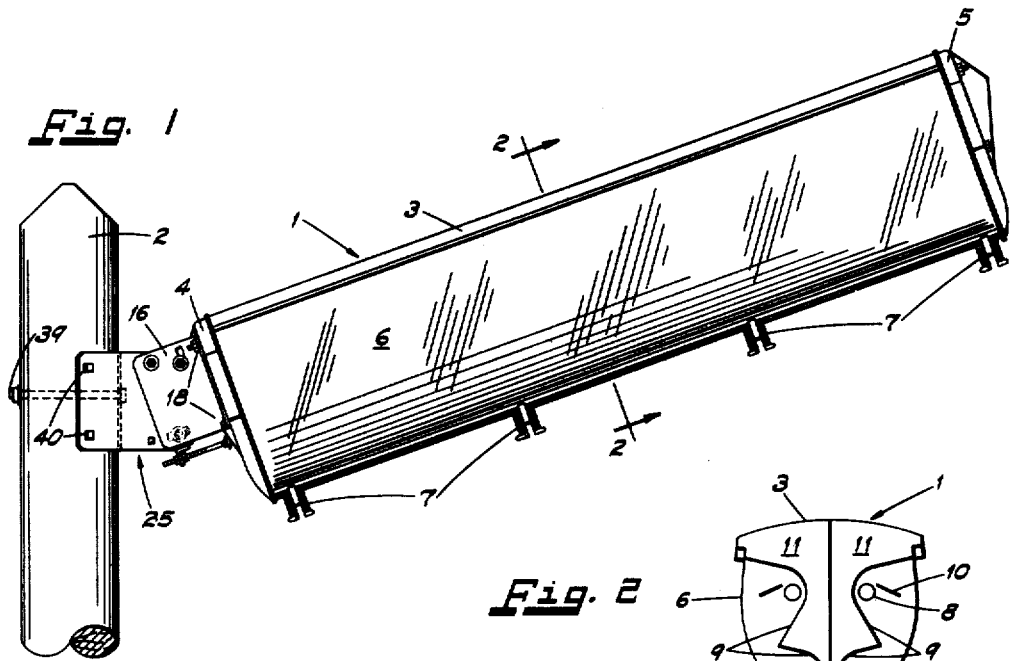
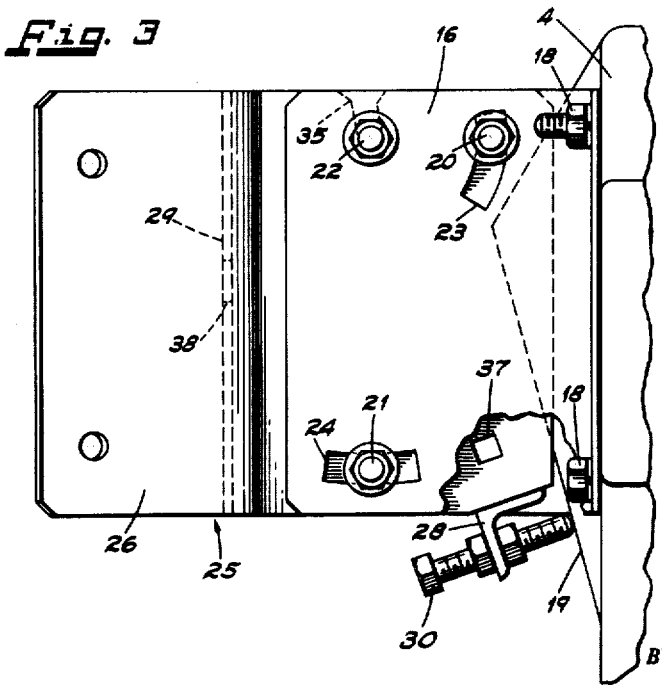
INVENTOR.
Donald W. Harling
BY
Attorney Aug. 5, 1958    D. W. HARLING    2,846,570
ADJUSTABLE SUPPORT FOR A FLUORESCENT STREET LIGHT
Filed Jan. 28, 1955    3 Sheets-Sheet 2

INVENTOR.
Donald W. Harling
BY
Attorney

Aug. 5, 1958 D. W. HARLING 2,846,570
ADJUSTABLE SUPPORT FOR A FLUORESCENT STREET LIGHT
Filed Jan. 28, 1955 3 Sheets-Sheet 3

INVENTOR.
Donald W. Harling
BY
Attorney

United States Patent Office

2,846,570
Patented Aug. 5, 1958

2,846,570

ADJUSTABLE SUPPORT FOR A FLUORESCENT STREET LIGHT

Donald W. Harling, Milwaukee, Wis., assignor to McGraw-Edison Company, a corporation of Delaware Application January 28, 1955, Serial No. 484,804

3 Claims. (Cl. 240—67)

The present invention relates to a fluorescent street lighting luminaire, and particularly pertains to a mounting arrangement for supporting said luminaire from vertically disposed objects, such as building walls, and especially from metal and wood poles.

Fluorescent luminaires have become increasingly popular in recent years for use in street lighting as they have a comparatively low brightness or glare when related to conventional small source luminaires, such as mercury vapor lamps and incandescent lamps.

The minimum of glare or brightness that is produced by fluorescent lighting is directly due to the fact that the luminaires have a very large light source, which source also provides adequate candle power for street lighting.

It is apparent that when driving down a wet street, the only illumination that the motorist can see from street lighting is the streaks of light directly from each luminaire to his eyes. Where concentrated light source types of street luminaires are used, the streaks illuminate only a small portion of the street. By increasing this light source to the size of fluorescent luminaires, these streaks or bands are greatly widened and in considering any street lighting system, it is possible to almost completely cover the whole street with streaks of light so that objects travelling across the street or cutting beams of light can be very easily observed.

Although it is the main function of the street lighting luminaire to deliver light to the street itself, it will be apparent that if just a tunnel effect of lighting were placed on the street area, the person driving down the street would be handicapped by his inability to see objects approaching this tunnel of light. These objects could be cars coming in off the side streets or pedestrians approaching the curb line preparatory to crossing the street. Lighting of surrounding areas also gives the driver a chance to anticipate actions by those people not actually in his lane of traffic, but who may drift out into his lane. It has been proven in interior lighting that background lighting or surrounding area lighting is very important even when certain objects are being high-lighted to attract attention. The fluorescent light more than adequately provides the secondary lighting of background and surrounding area. Of course, one factor to be reckoned with is that the width of streets varies from one municipality to another, and even varies within certain areas of an individual community. Thus, it becomes evident that it often becomes desirable to vary the position of the elongated light source to take into account variations in street widths and changes in background.

It is, therefore, an object of the present invention to provide a fluorescent street lighting luminaire and adjustable mounting bracket therefore, which luminaire may be angularly disposed relative to the horizontal plane of the street to provide a selective light distribution pattern at the street level, depending upon the street width and the particular background at the house side of the luminaire.

It is another object of the present invention to provide an adjustable mounting bracket for a fluorescent luminaire, which bracket permits said luminaire to be angularly disposed relative to the horizontal, and which further permits the luminaire to be adjusted angularly to compensate for raking or tilting of its vertical support member, such as a building or pole.

It is a further object of the present invention to provide an adjustable mounting bracket for a fluorescent luminaire, which bracket incorporates means for lining up a series of luminaires relative to one another.

It is still another object of the present invention to provide an adjustable mounting bracket for fluorescent luminaires, which bracket takes the form of one or more embodiments which alternatively permit positioning of the luminaire on wood poles or imperforate metallic ornamental street lighting supports.

Other objects and advantages of the invention will appear from the following detailed description of species thereof, and from the accompanying drawings in which:

Fig. 1 is a side elevational view of a fluorescent street lighting fixture embodying the present invention.

Fig. 2 is a diagrammatic view approximating the cross section taken at lines 2—2 of Fig. 1, and showing the basic reflector, deflector and light sources of the luminaire.

Fig. 3 is a fragmentary elevational view partly in section, particularly illustrating the adjustable mounting bracket, and further showing the luminaire in its horizontal operating position.

Figure 4:
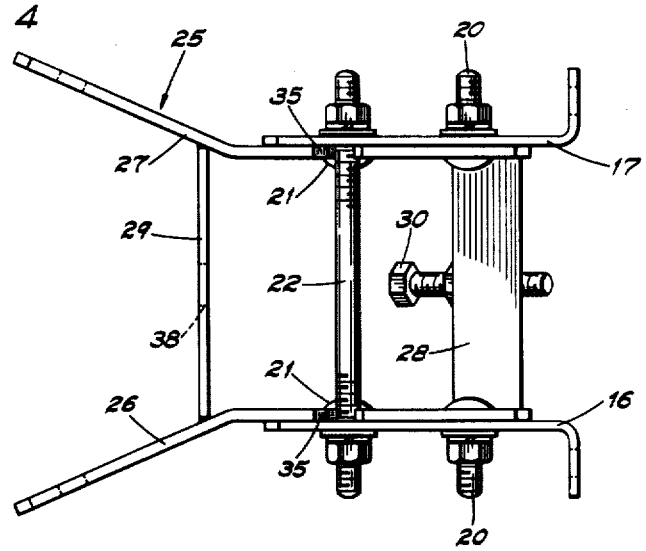
Fig. 4 is a plan view of the mounting bracket of Fig. 3 with the luminaire removed, and as arranged for mounting on wood poles.

Referring to the drawings in detail, and especially to Fig. 1, the luminaire assembly comprises the luminaire 1 which is preferably suspended laterally outwardly relative to a mounting pole 2. The luminaire is preferably suspended substantially normal to the center line of the street, and with the curb line of the street (not shown) located centrally of the luminaire.

Figure 8:
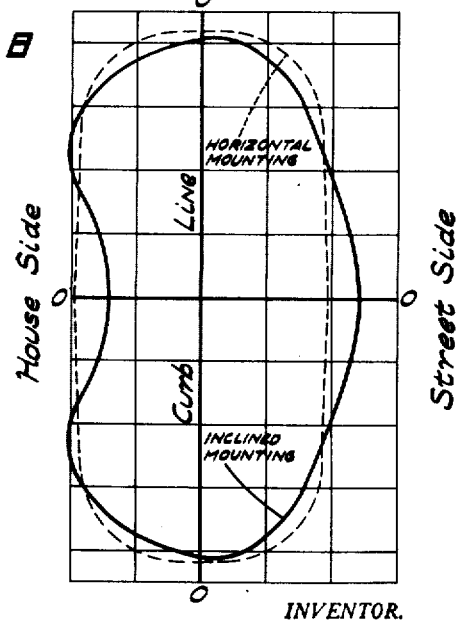
Fig. 8 is a light distribution diagram illustrating the street level light distribution of the luminaire in its extreme positions; at the horizontal, and at its full angularly disposed position relative to the horizontal.

As shown in Fig. 1, the luminaire is disposed angularly relative to the horizontal to provide a light distribution pattern with a greater portion of its total area on the street surface, rather than at the house side inwardly of the curb line. The light distribution pattern of the luminaire positioned as shown in Fig. 1 is illustrated by the solid lines of the isolux chart of Fig. 8.

The luminaire 1 is generally provided with a housing 3 closed at both ends by means of end cover castings 4 and 5, respectively. The transparent covers 6 are preferably of a flexible plastic, such as an acrylic resin. The covers are hinged from the housing 3 and clamped in place by means of the clamping members 7.

Referring now to the diagram of Fig. 2, the interior members of the luminaire 1 generally include a plurality of fluorescent tubes 8 with appropriate reflectors 9 and deflectors 10. The optical assembly portions are supported from bulkheads 11 positioned at spaced intervals transversely of the length of the elongated luminaire. It is preferable to position each portion of the optical assembly symmetrically about the vertical axis of the luminaire. This provides a unitary structure having, in this case, four parallel fluorescent tubes. However, the present invention is also intended to apply to two independent two-lamp units arranged in back-to-back relationship (not shown). The four-lamp unit is fully described and claimed in patent application, Serial No. 484,703, filed on January 28, 1955, by Donald W. Harling, and assigned to the same assignee as is the present invention. The two-lamp unit is fully described and claimed in the patent application, Serial No. 484,805, filed on January 28, 1955, by Donald W. Harling, and assigned to the same assignee as is the present invention.

The component parts of one embodiment of the adjustable bracket for the luminaire may best be described with reference to Figs. 1, 3 and 4. The particular embodiment of these figures relates to a vertical support member for the luminaire, which takes the form of a wooden pole 2.

The bracket preferably is provided with right and left hand, L-shaped, luminaire support members 16 and 17, respectively. The support members are arranged to receive mounting bolts or studs 18 protruding from the luminaire end cover 4. The end cover casting 4 is preferably provided with an inclined wedge portion 19 for purposes hereinafter described.

The major portion of each of the L-shaped support members is provided with apertures for receiving mounting bolts 20 and 21, respectively, and the double-armed stud or pivot member 22 positioned transversely relative thereto. The mounting bolts are slidably received by the elongated curvate apertures 23 and 24, respectively. It is to be noted that it is preferable to provide the apertures as a segment of a circle having its center coinciding with the center of the stud or pivot member 22, for purposes hereinafter described. The support members 16 and 17 are positioned in telescope relationship with the stationary bracket 25, as is best illustrated in Fig. 4. The bracket 25 is preferably of an integrally formed unit comprising spaced right and left hand stationary support members 26 and 27, respectively, which stationary support members are held in spaced-apart relationship by means of the transversely disposed angle member 28 and backing plate 29, respectively. It is preferable to weld the various pieces to one another.

The angle member 28 is preferably apertured to receive an adjusting nut and bolt assembly 30. The nut and bolt assembly 30, shown in Figs. 3, 4 and 5, is relatively short as compared with the nut and bolt assembly 31 of Figs. 1 and 6. The assembly 30 is used for fine adjustment for luminaires placed in the horizontal position, and compensates for any rake or tilt of the vertical support, such as the pole 2. Thus, with this adjustment between the assembly 30 and the inclined wedge portion 19 of the cover casting 4, a series of luminaires may be "lined up" with respect to one another without removing the units from the pole. The compensating adjustment for luminaires established at an incline from the horizontal, as shown in Figs. 1 and 6, is made in the same manner with a relatively longer, commercially available, inexpensive, carriage bolt assembly 31. It will be apparent that the adjustment can also be made with a nut and bolt assembly of specific length and varying the rotative position of the angle member 28 (not shown) but this would involve a relatively more complex and expensive assembly, and require two or more brackets for variations in mounting angles. Both of the stationary support members 26 and 27, respectively, are provided with an open-ended slot 35 for receiving the double-armed stud or pivot 22, which is removable therefrom. Each stationary support member is also provided with apertures for receiving the mounting bolts 20 and 21, respectively. With reference to Figs. 3 and 6, it will be apparent that the apertures are preferably square-shaped to receive the square shoulder portion of conventional mounting bolts to prevent the bolt from rotating while fastening a nut and washer thereon. The aperture 36 (see Fig. 6) is provided to receive the mounting bolt 21 when the luminaire is placed in horizontal position as shown in Fig. 3. The aperture 37 (see Fig. 3) is arranged to receive the mounting bolt 21 when the luminaire it tilted to its angularly disposed position as shown in Figs. 1 and 6.

It is to be noted that the backing plate 29 is preferably provided with a keyhole slot 38 for receiving the headed end of a thru bolt 39 seated in the pole 2. Thus, the bracket with the luminaire attached thereto may be mounted directly on the pole with the slot 38 receiving the thru bolt 39. While so mounted, the lag screws 40 may be fastened in the pole through apertures in the pole bracket 25.

Figure 7:
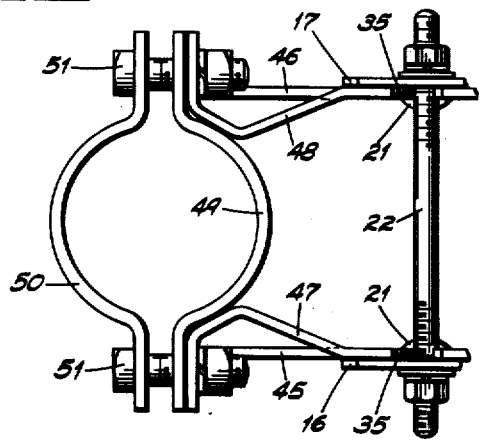
Fig. 7 is a fragmentary plan view of a portion of another embodiment of the adjustable mounting bracket, and in this specific embodiment it is suitable for mounting on ornamental metal standards.

Another embodiment of the present invention is shown in the modified bracket of Fig. 7 wherein the right and left hand support members 16 and 17 are attached to the pole bracket in the same manner as previously described. That is, it is preferred to use a double-arming stud or pivot 22 received by apertures in the right and left hand supporting members and seated in the slots 35 of the respective stationary support members 45 and 46, respectively.

In the present embodiment the stationary support members 45 and 46 are modified during stamping and forming operations to provide inwardly bent integral portions 47 and 48 intermediate its upper and lower edges The portions 47 and 48 are provided with a reverse bend, which laterally abuts a C-shaped clamping half-band 49. The entire assembly may be clamped to the outer periphery of a conventional imperforate ornamental street lighting pole by means of a cooperating half-band member 50 and carriage bolt assemblies 51.

The operation of my invention is as follows:

Referring first to the embodiment of Figs. 1 through 6, the fluorescent luminaire may be mounted on a wood pole or an object that may be perforated to receive thru bolts and/or lag screws. A centrally located fastener, such as a thru bolt 39, is first positioned in the wood pole 2. The thru bolt is preferably not tightened in place in order to provide room for the backing plate 29 to be placed between the wood pole 2 and the head of the thru bolt, as shown in Fig. 1. Thus, the bracket 25 is first positioned on the thru bolt with the keyhole slots 38 of the backing plate being mounted over the shank of the thru bolt. The bracket 25 is then fastened into place on the pole by means of the lag screws 40.

Figure 5:
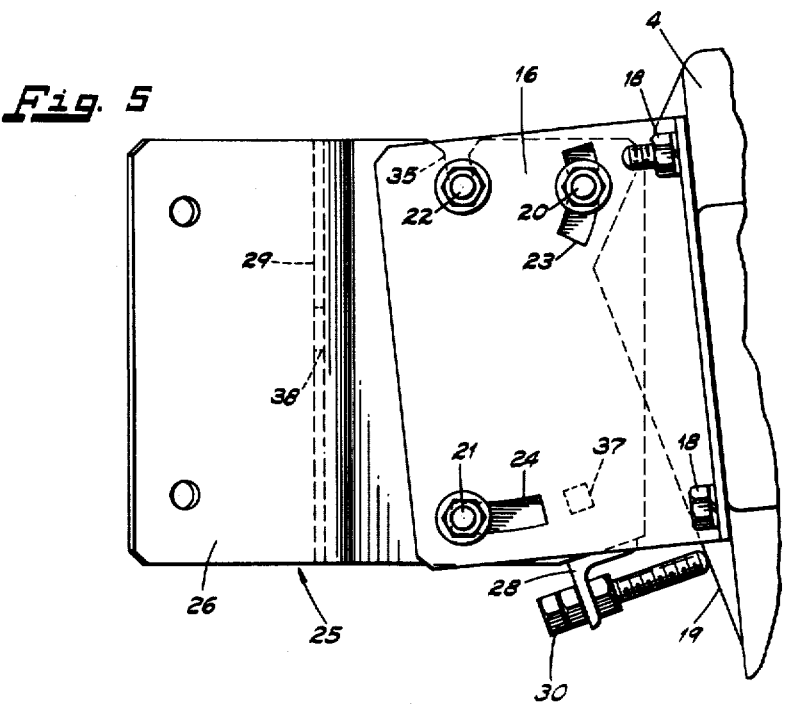
Fig. 5 is a fragmentary elevational view showing the fluorescent luminaire at a predetermined position angularly relative to the horizontal and compensating for vertical misalignment of its vertical support (not shown).
Figure 6:
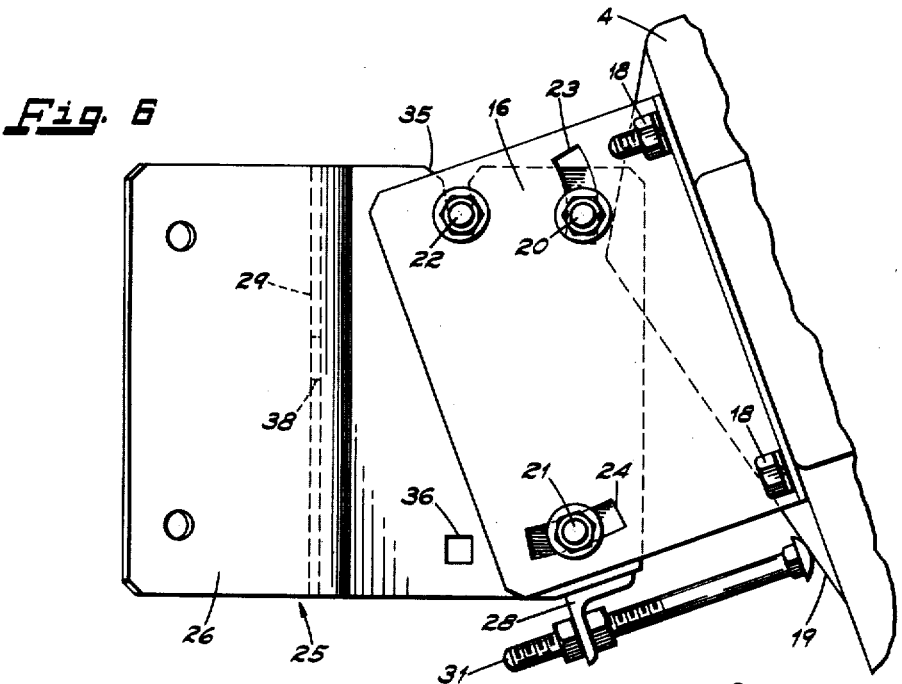
Fig. 6 is a view similar to Figs. 3 and 5, but with the fluorescent luminaire being angularly disposed relative to the horizontal and at its extreme position.

If it is desired to mount the luminaire in a substantially horizontal position with respect to the street level, the relatively shorter bolt and nut assembly 30 is inserted in the apertured angle member 28, as shown in Figs. 3, 4 and 5. The left and right hand support members 16 and 17, respectively, are fastened to the end casting 4 by means of the mounting bolts 18, with the double-arming stud 22 fastened in place transversely of the members 16 and 17. The support members are then positioned with the stud 22 being pivotally received by the open-ended slot 35. The upper mounting bolt 20 is next placed in position with the head portions thereof being at the inside, as shown in Fig. 4, and the cooperating nuts and washers are then loosely threaded thereon. For horizontal mounting the lower mounting bolt assembly 21 is placed in the appropriate aperture 36 (shown best in full lines in Fig. 6). The appropriate mounting bolt assembly 21 is then placed in the aperture with its head towards the inside, as shown in Fig. 4, and its cooperating nut and washer loosely threaded thereon.

With the luminaire mounted as shown in Fig. 3, it often becomes desirable to adjust the luminaire for any rake or tilt in the mounting pole 2, or for purposes of lining up a series of luminaires. It will be apparent that this function may be accomplished with the adjusting bolt assembly 30 engaging the inclined wedge portion 19 to bring the luminaire 1 to the desired position of Fig. 5. After leveling or "lining up" operations are completed, the mounting bolt assemblies 20 and 21, respectively, are then tightened in place for secure support of the luminaire.

For inclined mounting of the luminaire 1, attention is directed to Figs. 1 and 6, wherein the bracket 25 is positioned on the pole 2 in the same manner as described in connection with Figs. 3, 4 and 5. Here, however, the right and left hand luminaire support members 16 and 17 are positioned with the lower mounting bolt assembly 21 being placed in the aperture 37 (shown best in Figs. 3 and 5). Again, the double-arming stud or pivot 22 is placed in the open-ended slot 35 of the stationary supports.

It is to be noted, that although only two variations of aperture positions, as designated by the apertures 36 and 37, are shown, it is within the province of this invention to provide apertures at different sectoral angles relative to the pivot 22, and that a plurality of such apertures (not shown) may be provided if so desired. It will be apparent that although a selective series of apertures, such as those designated at 36 and 37 is preferred for strength reasons, it is conceivable that a continuous slot (not shown) in the form of a sector of a circle with its center at the pivot 22 may be provided for any angular selection within the dimensional limits of such slot.

The inclined luminaire may also be adjusted for leveling or "lining up" by means of the adjustment bolt and nut assembly 31, which utilizes a relatively longer bolt than the assemblies 30 previously described. After the leveling or "lining up" procedure is completed, the mounting bolt assemblies 20 and 21 are tightened in place to secure the luminaire in operating position.

It will be apparent that although the bracket assembly has been shown and described as supporting a luminaire from one end thereof, a substantially identical bracket (not shown) may be used for supporting the luminaire from a position intermediate its ends, such as with the use of a mast arm (not shown), to obtain a variety of angular mounting positions of the luminaire.

It will also be apparent that the operation of the embodiment of Fig. 7 is substantially the same as that described with the first-mentioned embodiment. The only difference in procedure is that the stationary bracket portion is first mounted on an imperforate, conventional mounting standard by means of the embracing half-bands 49 and 50 and their fastening means, comprising the carriage bolt assemblies 51.

It will be apparent that the present invention has provided an adjustable mounting arrangement for a fluorescent street lighting luminaire which permits the luminaire to be supported at a predetermined angle relative to the horizontal plane of the street, and which angular mounting is desired to obtain a particular light distribution pattern on the street level depending upon variations in street width and background at the house side of the luminaire.

I claim:
1. An adjustable mounting bracket for supporting an elongated fluorescent street lightnig luminaire at the inner end thereof relative to a vertical support, comprising, in combination, a stationary support member adapted for fastening to said vertical support, a luminaire support member arranged for rigid securement with said inner end to said luminaire, each of said support members defining laterally extending oppositely spaced wall sections, adjacent pairs of which are respectively rotatably slidable relative to one another, pivot means rotatably joining said respective wall sections, at least one of said wall section pairs of said luminaire support member and of said stationary support member defining at least one pair of registerable apertures, one of the apertures of said pair being disposed on an arc spaced from the axis of said pivot means and augularly spaced from the vertical plane parallel with said vertical support and coincident with said axis, the other of said apertures defining an arcuate slot about said axis, releasable fasteners axially slidably received by said registerable apertures and arranged for relative transverse slidable movement with said arcuate slot for maintaining said luminaire at a predetermined angle relative to said vertical support, and adjustable stop means cooperable with said stationary support member and with said inner end of said luminaire and arranged to provide fine angular adjustment in opposed directions relative to said predetermined angle.

2. An adjustable mounting bracket for supporting an elongated fluorescent street lighting luminaire at the inner end thereof relative to a vertical support; comprising, in combination, a stationary support member adapted for fastening to said vertical support, a luminaire support member arranged for rigid securement with said inner end of said luminaire, each of said support members defining laterally extending oppositely spaced wall sections, adjacent pairs of which are respectively rotatably slidable relative to one another, the wall sections of said stationary support member each further defining an open-ended pivot supporting slot, a transverse pivot pin jointly secured to the said wall sections of said luminaire support member and arranged to be pivotably supported by said open-ended slots, at least one of said wall section pairs of said luminaire support member and of said stationary support member defining at least one pair of registerable apertures, one of the apertures of said pair being disposed on an arc spaced from the axis of said pivot means and angularly spaced from the vertical plane parallel with said vertical support and coincident with said axis, the other of said apertures defining an arcuate slot about said axis, a bolt and nut assembly axially slidably received by said registerable apertures and arranged for relative transverse slidable movement with said arcuate slot for maintaining said luminaire at a predetermined angle relative to said vertical support, and adjustable stop means comprising a transverse bar joining the opposed wall sections of said stationary support member and a threaded bolt disposed intermediate its ends and cooperable with said inner end of said luminaire to provide fine angular adjustment in opposed directions relative to said predetermined angle.

3. An adjustable mounting bracket for supporting an elongated fluorescent street lighting luminaire at the inner end thereof relative to an imperforate vertical pole; comprising, in combination, a stationary support member including cooperating half-bands arranged for embracing relationship with said pole, bolt and nut assemblies arranged to releasably draw said half-bands towards clamping engagement relative to said pole and to one another, a luminaire support member arranged for rigid securement with said inner end of said luminaire, each of said support members defining laterally extending oppositely spaced wall sections, adjacent pairs of which are respectively rotatably slidable relative to one another, pivot means rotatably joining said respective wall sections, at least one of said wall section pairs of said luminaire support member and of said stationary support member defining at least one pair of registerable apertures, one of the apertures of said pair being disposed on an arc spaced from the axis of said pivot means and angularly spaced from the vertical plane parallel with said vertical support and coincident with said axis, the other of said apertures defining an arcuate slot about said axis, releasable fasteners axially slidably received by said registerable apertures and arranged for relative transverse slidable movement with said arcuate slot for maintaining said luminaire at a predetermined angle relative to said vertical support, and adjustable stop means cooperable with said stationary support member and with said inner end of said luminaire and arranged to provide fine angular adjustment in opposed directions relative to said predetermined angle.

References Cited in the file of this patent

UNITED STATES PATENTS

| | | |
|---|---|---|
| 1,256,690 | Helgeson | Feb. 19, 1918 |
| 2,040,821 | Benjamin | May 19, 1936 |
| 2,170,882 | Wideroe | Aug. 29, 1939 |
| 2,540,784 | Hocher | Feb. 6, 1951 |
| 2,574,038 | Howard | Nov. 6, 1951 |
| 2,608,369 | Hocher | Aug. 26, 1952 |
| 2,628,807 | Lincoln | Feb. 17, 1953 |
| 2,667,317 | Trebules | Jan. 26, 1954 |
| 2,696,357 | Elmer | Dec. 7, 1954 |
| 2,732,483 | Elmer | Jan. 24, 1956 |
| 2,732,487 | Crider | Jan. 24, 1956 |

FOREIGN PATENTS

| | | |
|---|---|---|
| 279,992 | Great Britain | 1957 |

UNITED STATES PATENT OFFICE
CERTIFICATE OF CORRECTION

Patent No. 2,846,570                                                         August 5, 1958

Donald W. Earling

It is hereby certified that error appears in the printed specification of the above numbered patent requiring correction and that the said Letters Patent should read as corrected below.

Column 5, line 67, for "to" read -- of --; column 6, line 1, for "augularly" read -- angularly --.

Signed and sealed this 11th day of November 1958.

(SEAL)
Attest:

KARL H. AXLINE
Attesting Officer

ROBERT C. WATSON
                                                                                       Commissioner of Patents